United States Patent [19]

Cunningham

[11] Patent Number: 5,564,992

[45] Date of Patent: Oct. 15, 1996

[54] TORQUE MAXIMIZING CONTROLLED SLIP GEAR DRIVE

[76] Inventor: James T. Cunningham, 16811 Woodside Dr., Livonia, Mich. 48154

[21] Appl. No.: 221,337

[22] Filed: Mar. 31, 1994

[51] Int. Cl.⁶ ........................................ F16H 3/74
[52] U.S. Cl. .................. 475/257; 475/94; 475/273; 475/306
[58] Field of Search .................. 475/91, 93, 94, 475/116, 120, 306, 31, 336, 257, 273

[56] References Cited

U.S. PATENT DOCUMENTS

| | | | |
|---|---|---|---|
| 401,841 | 4/1889 | Lemieux | 475/306 |
| 1,374,947 | 4/1921 | Newhouse | 475/224 |
| 3,505,908 | 4/1970 | Herrmann | 475/93 |
| 3,520,376 | 7/1970 | Muller | 475/21 |
| 4,077,278 | 3/1978 | Combastet | 475/330 |
| 4,572,318 | 2/1986 | Cady | 475/201 |

FOREIGN PATENT DOCUMENTS

| | | | |
|---|---|---|---|
| 825644 | 3/1938 | France | 475/306 |
| 135358 | 11/1919 | United Kingdom | 475/306 |

OTHER PUBLICATIONS

Automotive Industries, Dec. 1993 "An Automatic Answers".

Primary Examiner—Charles A. Marmor
Assistant Examiner—Sherry Lynn Estremsky
Attorney, Agent, or Firm—Dykema Gossett PLLC

[57] ABSTRACT

A torque enhancer for use between a driving member and a driven member includes a housing and a gear set rotatably supported within the housing. The gear set has an input member, an output member, and a reaction member. Torque is transferred between the input member and the output member when rotation of the reaction member is resisted. A braking element is disposed within the housing and operably engages the reaction member to resist the rotation of the reaction member, thereby causing torque to be transferred between the input member and the output member. A controller means connected to the brake means modulates engagement of the reaction member by the brake means to maximize output member acceleration.

13 Claims, 9 Drawing Sheets

| TRANSMISSION GEAR | GEAR PUMP | CLUTCH 576 | BRAKE 572 | CLUTCH 578 | BRAKE 570 | CLUTCH 580 | BRAKE 568 | CLUTCH 582 | BRAKE 566 |
|---|---|---|---|---|---|---|---|---|---|
| 4TH<br>- NORMAL<br>- INCR. TORQUE<br>W/ACCELERATION | STOPPED<br>ROTATION<br>SLOWING | UNLOCKED<br>LOCKED | ON<br>OFF | UNLOCKED<br>UNLOCKED | ON<br>ON | UNLOCKED<br>UNLOCKED | ON<br>ON | UNLOCKED<br>UNLOCKED | ON<br>ON |
| 3RD<br>- NORMAL<br>- INCR. TORQUE<br>W/ACCELERATION | STOPPED<br>ROTATION<br>SLOWING | UNLOCKED<br>UNLOCKED | OFF<br>OFF | UNLOCKED<br>LOCKED | ON<br>OFF | UNLOCKED<br>UNLOCKED | ON<br>ON | UNLOCKED<br>UNLOCKED | ON<br>ON |
| 2ND<br>- NORMAL<br>- INCR. TORQUE<br>W/ACCELERATION | STOPPED<br>ROTATION<br>SLOWING | UNLOCKED<br>UNLOCKED | OFF<br>OFF | UNLOCKED<br>UNLOCKED | OFF<br>OFF | UNLOCKED<br>LOCKED | ON<br>OFF | UNLOCKED<br>UNLOCKED | ON<br>ON |
| 1ST<br>- NORMAL<br>- INCR. TORQUE<br>W/ACCELERATION | STOPPED<br>ROTATION<br>SLOWING | UNLOCKED<br>UNLOCKED | OFF<br>OFF | UNLOCKED<br>UNLOCKED | OFF<br>OFF | UNLOCKED<br>UNLOCKED | OFF<br>OFF | UNLOCKED<br>LOCKED | ON<br>OFF |

FIG.16

TORQUE MAXIMIZING CONTROLLED SLIP GEAR DRIVE

FIELD OF THE INVENTION

This invention relates to a method and apparatus for improving vehicle acceleration by increasing the amount of engine output torque which is provided at selected vehicle speeds. This invention further relates to a method and apparatus for replacing or enhancing conventional vehicle transmissions while concomitantly providing such torque enhancing features.

BACKGROUND OF THE INVENTION

Normally, as shown in FIG. 1, a typical automotive gasoline engine produces a maximum torque at an engine speed A far greater than its idling or initial "start up" engine rotational speed B. Such speeds A, B, as will be appreciated by one of ordinary skill in the art refer and relate to a crankshaft rotational speed, since the crankshaft is conventionally and mechanically coupled to the engine and rotates with substantially the same speed as the engine. Thus, rotational torque A, B, provided by the engine, is normally transmitted by the crankshaft in vehicle operation.

For example, as further shown in FIG. 1, a typical vehicle gasoline engine produces and provides a maximum amount of torque A at a crankshaft speed of about 3000 revolutions per minute. Speeds beyond this "maximum torque speed" result in decreased torque output, such as C. Moreover, as should be known to those of ordinary skill in the art and as further shown in FIG. 1, available torque varies as a function of engine speed.

When an engine is used to accelerate a vehicle, it is typically operating at the maximum torque speed for only a fraction of the total acceleration time. This is because the engine speed varies both as a function of vehicle speed and the selected transmission gear.

To produce maximum acceleration, it is very desirable to operate the engine at the maximum torque speed or higher. With the use of fixed ratio transmission gear ranges, however, it is necessary to operate the engine in a range between the maximum torque speed and a speed above maximum torque speed associated with the torque level C. Such maximum and near maximum torque production improves vehicle acceleration and further allows a relatively high torque to be maintained for conditions which would normally result in relatively low engine rotational speeds. Such acceleration improvements are very beneficial to police officers and others wishing to maximize vehicle acceleration and are further useful in aircraft (including helicopters), machine tools, outboard motors, trucks, construction and farm equipment, Jet boats, inboard powered boats, motorcycles, automobiles, tanks and other military vehicles, chain saws and a variety of other applications.

SUMMARY OF THE INVENTION

In one aspect of the invention, a torque enhancer for use between a driving member and a driven member is disclosed comprising a housing and a gear set rotatably supported within the housing. The gear set has an input member, an output member, and a reaction member. Torque is transferred between the input member and the output member when rotation of the reaction member is resisted. A braking element is disposed within the housing and operably engages the reaction member to resist the rotation of the reaction member, thereby causing torque to be transferred between the input member and the output member. A controller means connected to the brake means modulates engagement of the reaction member by the brake means to maximize output member acceleration.

The present invention allows maximum driving torque from a driving member such as an internal combustion engine to be transmitted to a driven member such as a vehicle transmission by controlling slip between the two, allowing the engine to operate continuously at a maximum torque speed of the engine thereby maximizing vehicle acceleration.

BRIEF DESCRIPTION OF THE DRAWINGS

FIG. 16 is a table illustrating the operation of the transmissions shown in FIGS. 13–14.

DETAILED DESCRIPTION OF THE PREFERRED EMBODIMENTS

Figure 2:
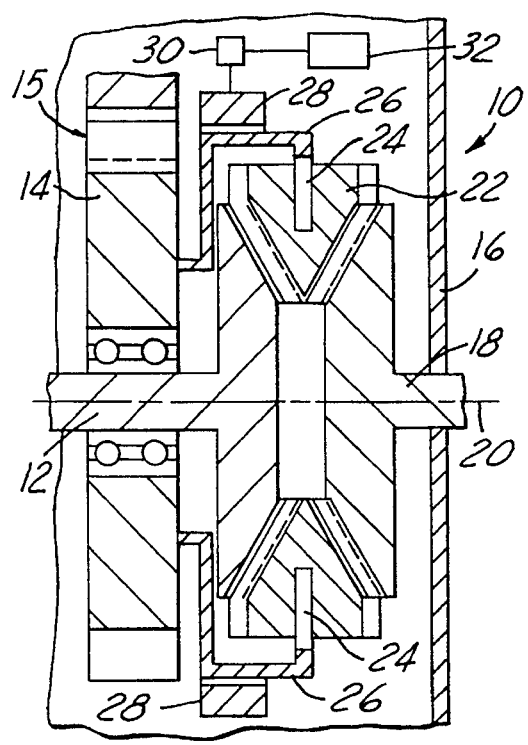
FIG. 2 is a schematic side view of a torque enhancer made in accordance with the teachings of a first embodiment of this invention.

Referring now to FIG. 2 there is shown a torque enhancer 10 made in accordance with the teachings of a first embodiment of this invention.

An input gear 12, rotating as a unit with an engine crankshaft (not shown) has a shaft passing through a pump housing. A pump rotor 14 is rotatably supported on the shaft of the input gear within the pump housing. The torque enhancer has an enclosing shell, or housing 16.

An output gear 18 is axially aligned with and faces the input gear. Both gears 12 and 18 are mounted for rotation about a common axis 20. Intermediate gears 22 are functionally disposed between the input gear and the output gear 18. Teeth of the intermediate gears 22 mesh with teeth of both the input gear 12 and the output gear 18. The intermediate gears 22 are rotatably supported on posts 24 of a gear carrier 26. The gear carrier 26 is fixed to a pump rotor 14 of a gear pump 15 for unitary rotation therewith about the axis 20. A brake band 28 fixed on one end to the stationary housing 16 wraps around the carrier 26 for operable engagement thereof.

Given this configuration with the input gear 12 rotating, and the output gear 18 held stationary by a resisting inertial torque, there are three possible modes of operation. A first mode is when the carrier 26 is allowed to spin freely. In this case, the output gear 18 remains stationary, and the carrier rotates about the axis 20 in the same direction as the input gear 12, but at a rotational speed half that of the input gear 12. With the carrier free spinning, no torque is transmitted by the input gear.

A second mode is when the carrier 26 is fixed relative to the housing 16 by the brake band 28. The output gear 18 must then rotate. The output gear 18 rotates at exactly the same speed as the input gear 12, but in the opposite direction, when just a single set of intermediate gears 22 is disposed between the input gear 12 and the output gear 18. The torque transmitted to the output gear 18 would be equal to the torque from the input gear 12, but in the opposite direction. The torque which the brake band 28 must apply to restrain the carrier 26 is twice the torque from the input gear 12 and in the opposite direction.

A third mode of operation is when the carrier 26 rotates and has a torsional resisting load applied to it wherein torque is transmitted to the output gear 18 even though the output gear 18 may not be moving. The torque transmitted from the input gear 12 to the output gear 18 is half of the torque applied to the carrier 26.

It is this relationship between the torque applied to the carrier 26 and the torque transmitted from the input gear 12 to the output gear 18 which is exploited in the embodiments of the present invention shown in FIG. 2.

A brake band actuator 30 is mounted to the housing 16 and is functionally disposed between the brake band 28 and the housing 16 to induce rotation resisting torque. The actuator 30 is electrically connected with a controller 32, or microprocessor. The controller 32 receives signals from a throttle position sensor, and an input gear speed sensor, and an output gear speed sensor. Torque resisting rotation of the carrier 26 can also be induced by a valve 34 variably restricting fluid flow from the pump housing shown in FIG. 3. Fluid is drawn by the gear pump 15 from a sump 36, passed through the variably restricting valve 34, and returned to the sump 36. A supplementary pump (not shown) may be disposed between the gear pump 15 and the sump 36 to ensure a continuous flow of fluid thereto. The valve 34 can be selectively varied from a full open position with no restriction to a fully closed position dead-heading the pump to effectively prevent the carrier from rotating, and a full range of positions therebetween.

The valve 34 operates in response to signals from the controller 32 to increase or decrease a drag torque on the carrier 26, similar to the manner in which the brake band 28 operates. For some valve configurations, it may be desirable to have a valve controller (not shown) disposed between the controller 32 and the valve 34 for translating electrical signals to mechanical motion.

There are two ways in which a desired level of torque can be transmitted from the input gear to the output gear. One is to lock the carrier 26 to the housing with one or both of the valve 34 and the brake 28. The second is to let the carrier 26 and the output gear 18 both rotate, as is done in the third mode of operation with one or both of the valve 34 and the brake providing a drag torque against the carrier 26.

It is the third mode of operation which is particularly useful in accelerating a vehicle.

Figure 1:
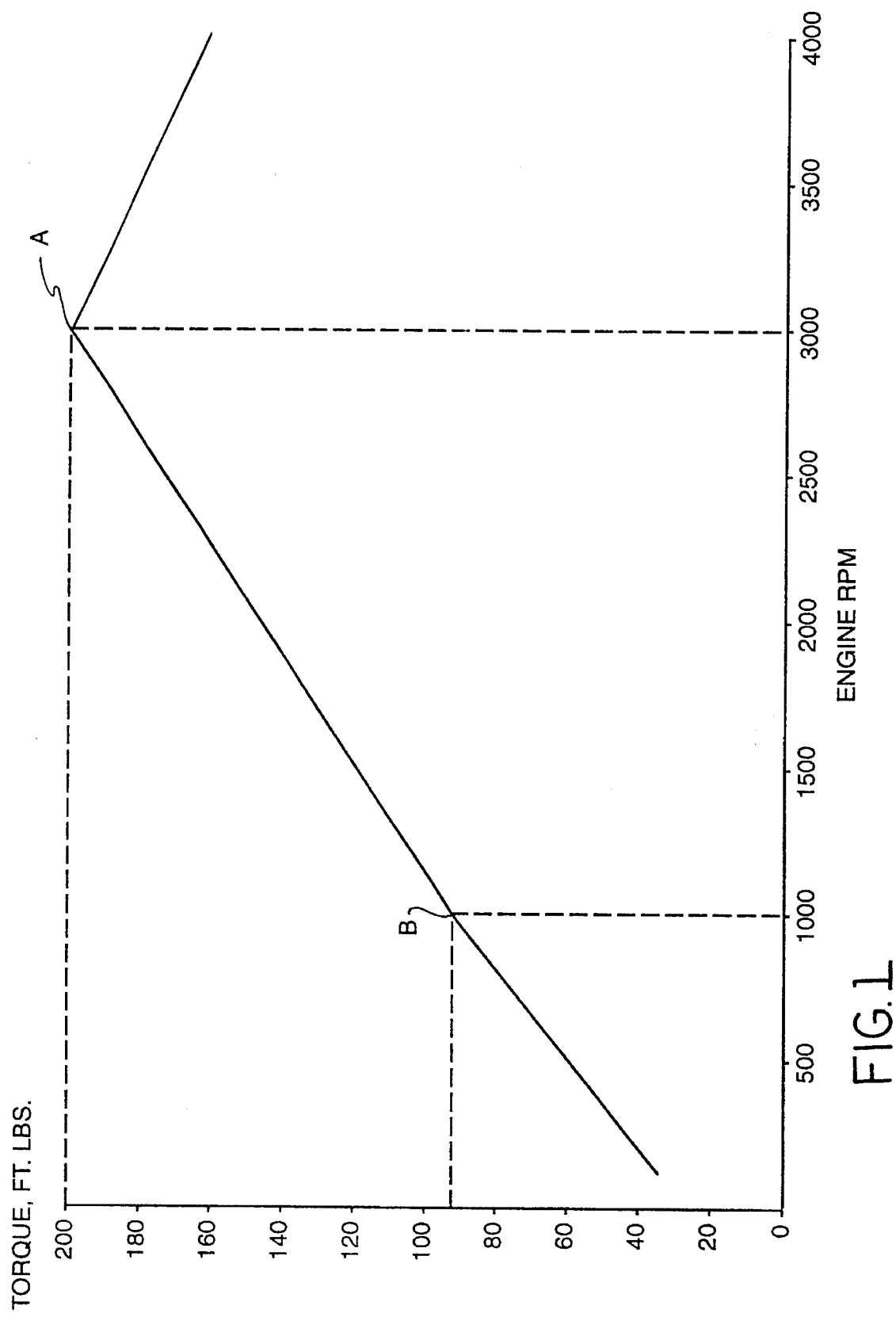
FIG. 1 is a graph illustrating the relationship between the torque produced by a conventional vehicle engine as a function of the rotational speed of the engine crankshaft.
Figure 4:
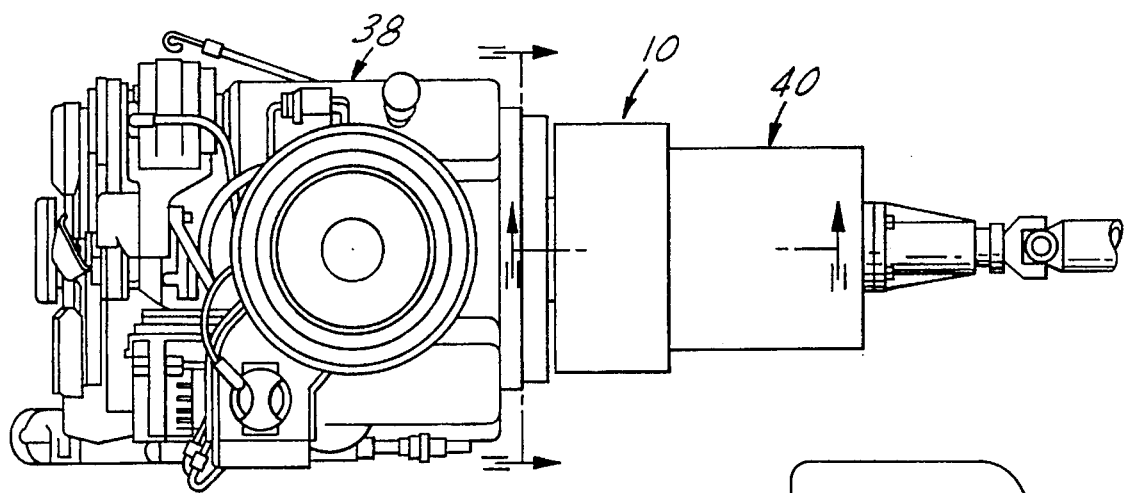
FIG. 4 is a top view of an engine shown in assembled relation with a torque enhancer made in accordance with the teachings of this invention.

An exemplary engine 38 shown in FIG. 4 and having a torque curve as illustrated in FIG. 1 reaches its maximum torque A at 3000 revolutions per minute (rpm). Such characteristic torque curves are well known within the art of internal combustion engines. To achieve maximum vehicle acceleration, it is desired to have the engine rotating at this maximum torque speed and higher. Whereas conventional transmissions allow the engine to operate in a range inclusive of the maximum torque speed for rapid accelerations, they do not allow the engine to operate continuously at and above the maximum torque speed. Operation below the maximum torque speed represents a loss in the potential acceleration rate of the vehicle. The present invention makes possible continuous operation of the engine 38 at and above the maximum torque speed and transfer of that maximum torque through a transmission 40 to vehicle road wheels (not shown).

For purposes of illustration, the following discussion of the operation of the torque enhancer of FIG. 2 is limited to the application of drag torque to the carrier 26 by the fluid restricting valve 34. It is to be appreciated that the drag torque could be alternatively provided by the brake band 28 acting by itself or with the fluid restricting valve 34.

A vehicle at a standing stop has the fluid restricting valve 34 completely open. The brake band 28 is disengaged. The torque enhancer 10 is hence in the first operating mode. The engine is operating at a relatively low idle speed of approximately 700 rpm. With the valve 34 open and the brake band 28 disengaged, the carrier 26 is able to rotate freely. The input gear 12 is rotating as a unit with the engine crankshaft. The output gear 18 is not rotating and is engaged through the transmission 40 with the vehicle drive wheels. The carrier 26 rotates at half the engine speed.

To achieve maximum acceleration, the accelerator pedal (not shown) is pressed completely to the floor of the vehicle to a wide open throttle (WOT) position. The actuator controller 32 begins to modulate or adjust the valve 34 toward a closed condition when the engine reaches a maximum torque speed. The engine torque rapidly reaches the maximum torque level A as the valve 34 is closed. The vehicle, and the output gear 18, are accelerated by the maximum engine torque transmitted thereto. Anti-rotation torque is applied to the pump rotor 14 by the closure of the valve 34 restricts rotation of the carrier 26 and induces torque in the carrier 26 equaling twice the torque being transmitted from the input gear 12 to the output gear 18, or twice the maximum engine torque. The output gear 18 and vehicle continue to increase in speed. As the difference between the absolute value of the rotational speed of the input gear 12 and the speed of the output gear 18 decreases, so does the rotational speed of the carrier 26. When the output gear 18 is rotating at near the maximum torque speed of the engine 38, that is when power transferred to the output gear approximately equals power from the engine, the carrier 26 is fixed by complete closure of valve 34 and the engagement of brake band 28.

Figure 19:
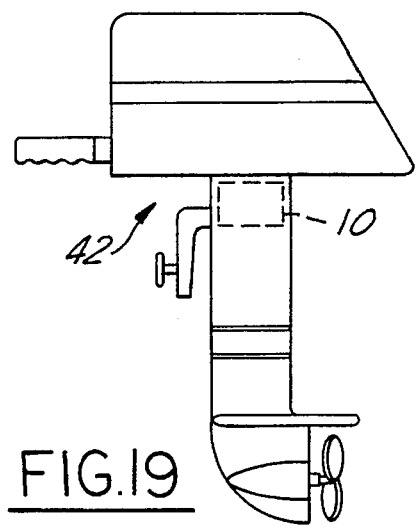
FIG. 19 is a side view of an outboard motor shown in assembled relation with a torque enhancer made in accordance with the teachings of this invention.

An alternative application of a torque enhancer 10 is shown in FIG. 19 where it is disposed within an outboard motor 42.

Figure 5:
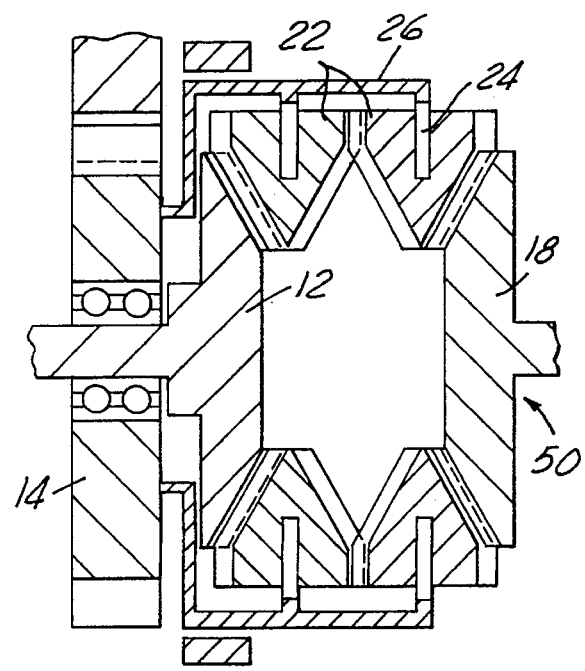
FIG. 5 is a schematic side view of a torque enhancer made in accordance with the teachings of a second embodiment of this invention.
Figure 6:
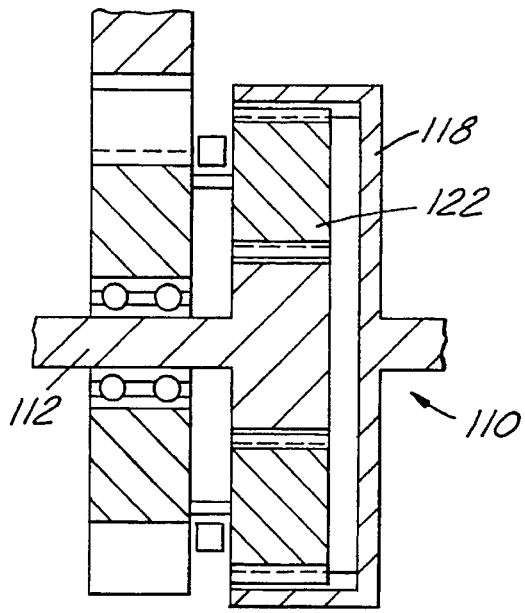
FIG. 6 is a schematic side view of a torque enhancer made in accordance with the teachings of a third embodiment of this invention.

FIGS. 5 and 6 illustrate alternative embodiments of this concept. FIG. 5 shows a torque enhancer 50 having double intermediate gears 22 which allow the input gear and the output gear to rotate in the same direction when torque is applied to the carrier 26. FIG. 6 shows a torque enhancer 110 in which the input gear is a sun gear 112 of a planetary system, the intermediate gears are planet gears 122, and the output gear is a ring gear 118 engaging the planet gears 122. The torque enhancer 110 of FIG. 6 provides a torque multiplying effect between the input gear and the output gear. The torque from the output gear will be greater than the torque to the input gear.

Figure 7:
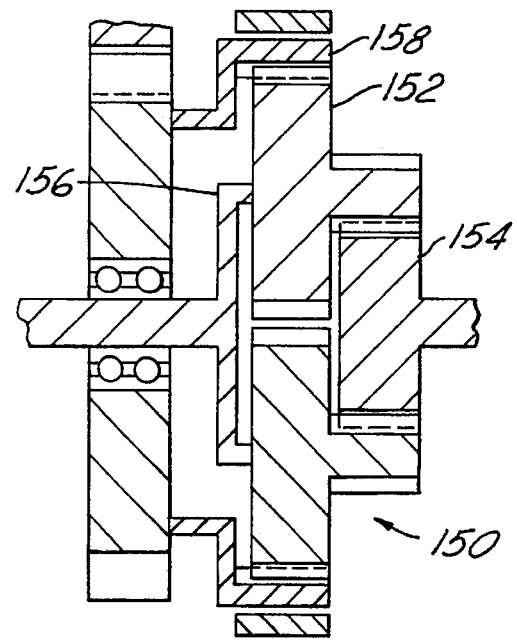
FIG. 7 is a schematic side view of a torque enhancer made in accordance with the teachings of a fourth embodiment of this invention.

FIG. 7 shows a torque enhancer 150 with stepped planet gears 152 which will consistently provide a torque reduction in an output gear 154 compared to the torque on the input member 156. As shown in FIG. 5, the input member 156 is the carrier 156 for the planet gears 152. When frictional and/or hydraulic drag torque is applied against ring gear 158, the gears 152, 154, 158 combine to decrease the torque from the input member 156 to the output gear 154.

Figure 8:
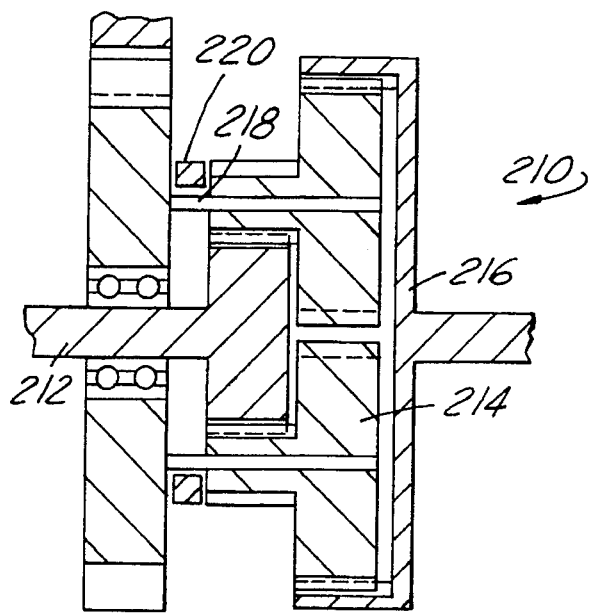
FIG. 8 is a schematic side view of a torque enhancer made in accordance with the teachings of a fifth embodiment of this invention.

FIG. 8 shows a torque enhancer 210 wherein the input gear is a sun gear 212 and intermediate gears are stepped planet gears 214 engaging an output gear in the form of a ring gear 216. This particular embodiment is able to provide an output torque equalling the input torque with an appropriate selection of gear pitch diameters. Frictional and hydraulic drag can be applied to the planet carrier 218 by a brake band 220 or a fluid restricting valve (not shown).

Figure 9:
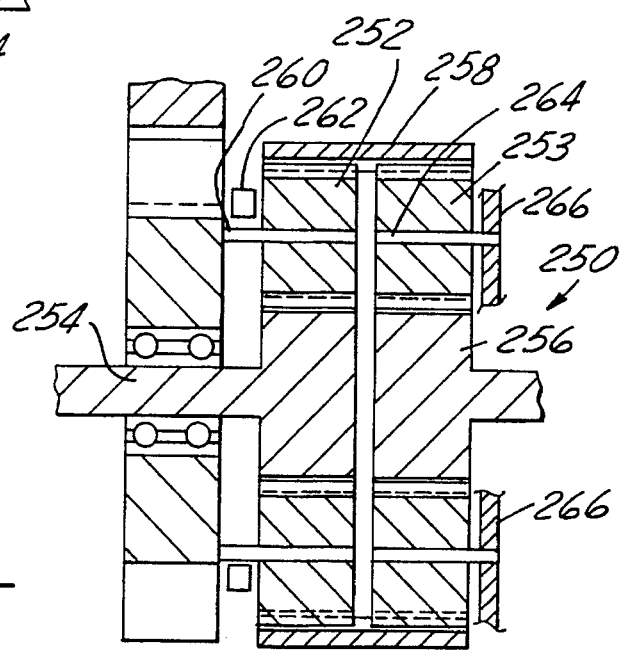
FIG. 9 is a schematic side view of a torque enhancer made in accordance with the teachings of a sixth embodiment of this invention.

FIG. 9 shows yet another embodiment of the torque enhancer 250 having two sets of planet gears 252 and 253. The input gear 254 and the output gear 256 each have a common pitch diameter and rotate in the same direction. Both planet gears 252 and 253 also have a common pitch diameter. The ring gear 258 is driven by the planet gears 252 associated with the input gear 254 and in turn drives the planet gears 253 associated with the output gear 256. The planet gears 252 associated with the input gear 254 are rotatably mounted on a carrier 260 which is alternately braked by a fluid restricting valve (not shown) or a band brake 262. The planet gears 253 associated with the output gear 256 rotate on shafts 264 fixed to the housing 266 of the torque enhancer 250. This configuration of the torque enhancer 250 provides an output torque equal to the input torque.

Figure 10:
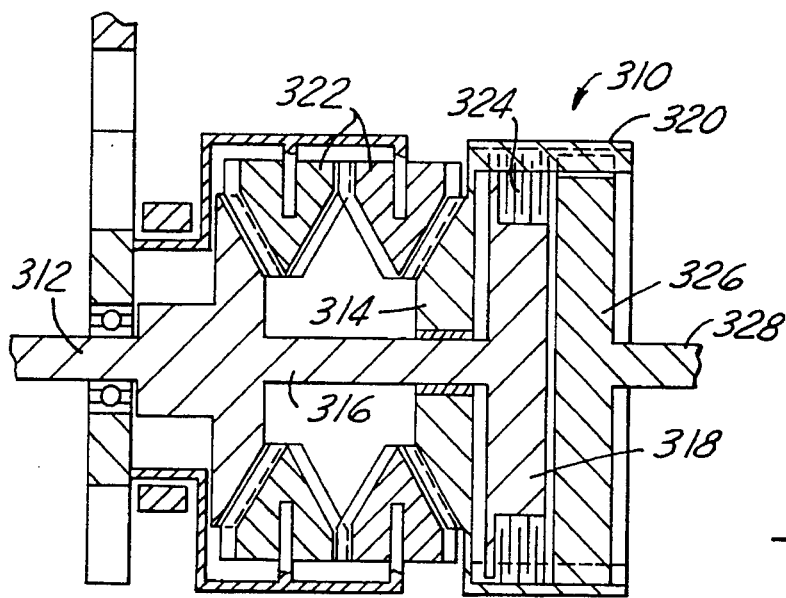
FIG. 10 is a schematic side view of a torque enhancer made in accordance with the teachings of a seventh embodiment of this invention.
Figure 11:
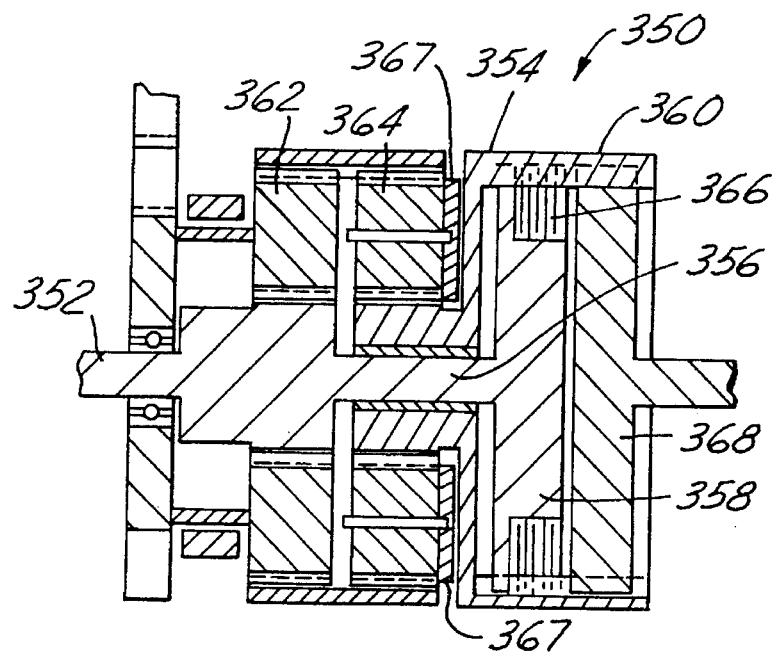
FIG. 11 is a schematic side view of a torque enhancer made in accordance with the teachings of an eighth embodiment of this invention.

FIGS. 10 and 11 illustrate two embodiments 310 and 350 of the torque enhancer in which torque is transmitted directly from the input gear 312 and 352 to the output gear 314 and 354 without the use of intermediate gears thereby improving the efficiency of the torque enhancer unit by eliminating energy lost by transferring torque through the intermediate gears. The torque enhancer 310 of FIG. 10 operates essentially the same as the torque enhancer 50 of FIG. 5. Torque enhancer 310 is structurally distinct from torque enhancer 50 in that a by-pass shaft 316 extends between the input gear 312 and a clutching member 318 which rotates as a unit with the input gear 312 and the by-pass shaft 316. The output gear 314 has a cylindrical drum 320 extending axially away from the intermediate gears 322. A clutch 324 is disposed between the clutching member 318 and the cylindrical drum 320. Axial pressure against the clutch 324 rotatably fixes the clutching member 318 to the output gear 314. An output member 326 is splined to the cylindrical drum 320 of the output gear 314 for unitary rotation therewith and has an output shaft 328 extending from the housing (not shown) of the torque enhancer 310. Operation of torque enhancer 310 is the same as that of torque enhancer 50 except that the clutch 324 is engaged when the output gear 314 is operating at the same rotational speed as the input gear 312, thereby transmitting the full torque from the input gear 312 to the output member 326 without any losses due to gearing inefficiencies when clutch 324 is engaged, the brake band is released, and the fluid restricting valve is opened.

Similarly, torque enhancer 350 of FIG. 11 operates much the same as torque enhancer 250 of FIG. 9. Torque enhancer 350 also has a by-pass shaft 356 extending from the input gear 352 to a clutching member 358. The output gear 354 has an axially extending cylindrical drum section 360 extending away from intermediate gears 362 and 364. A clutch 366 is similarly disposed between the drum 360 and the clutching member 358. The intermediate or planet gears 364 associated with the output gear 354 rotate about shafts which are fixed relative to the housing 367. An output member 368 is splined with the drum 360. Here as in FIG. 10, the clutch 366 between the output gear 354 and the clutching member 358 is engaged when the input gear 352 and output gear 354 are rotating at the same speed. This eliminates any gear losses through the intermediate gears 362 and 364 when the clutch 366 is engaged, the brake band is released, and the fluid restricting valve is opened.

Figure 12:
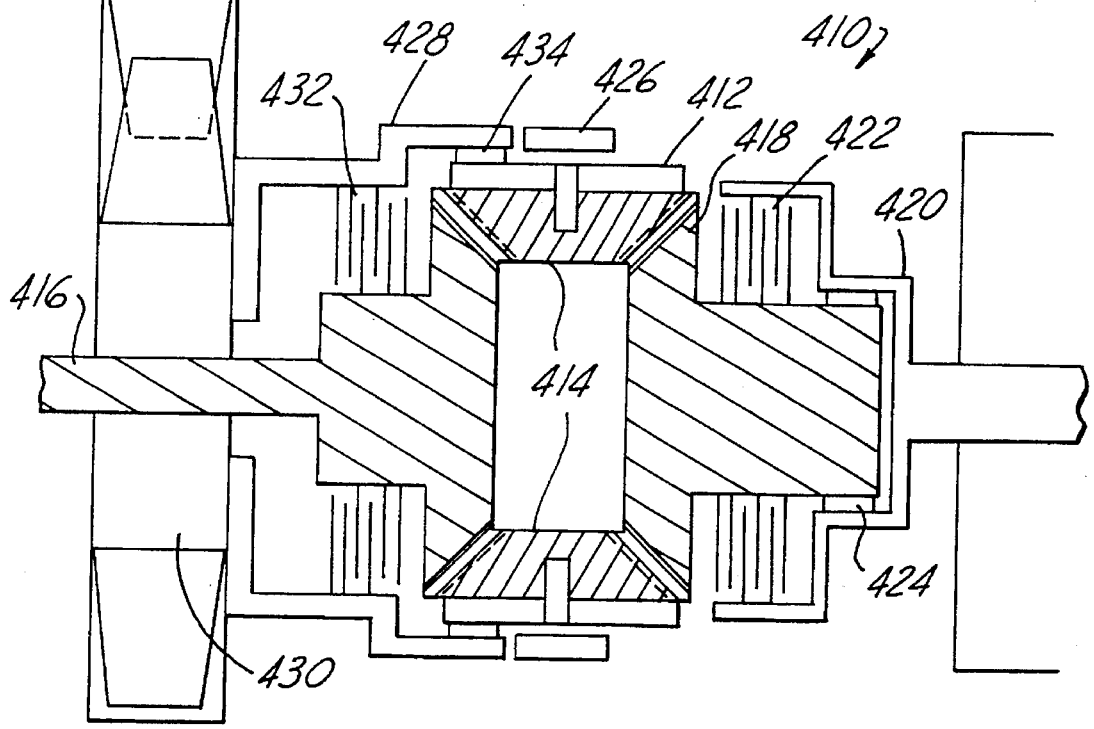
FIG. 12 is a schematic side view of a torque enhancer made in accordance with the teachings of a ninth embodiment of this invention.

FIG. 12 shows a torque enhancer 410 adapted to substitute for a torque converter between an engine and an automatic transmission or clutch between an engine and a manual transmission. The torque enhancer 410 shown in FIG. 12 has those elements found in the basic torque enhancer 10 shown in FIG. 2. A carrier 412 has rotatably mounted thereto intermediate gears 414. An input gear 416 is coupled to an engine crankshaft for unitary rotation therewith. An output gear 418 is engaged by intermediate gears 414 disposed between it and the input gear 416. The output gear 418 is selectively connected to a transmission input shaft 420 for unitary rotation therewith by output clutch 422 disposed therebetween and a first one-way clutch 424 disposed in parallel with the output clutch 422. The first one-way clutch 424 provides engagement between the transmission shaft 420 and the output gear 418 when the output gear 418 is rotating in a drive direction and torque is being transmitted from the output gear 418 to the transmission shaft 420. The one-way clutch 424 will not transmit torque in the opposite direction and the transmission shaft 420 will resultantly overrun the output gear 418. A brake band 426 is selectively engageable with the carrier 412. A pump drum 428 is rotatably fixed to a pump gear 430 for unitary rotation therewith. An input clutch 432 is disposed between the pump drum 428 and the input gear 416. A second one-way clutch 434 is disposed between the pump drum 428 and the carrier 412. The one-way clutch 434 causes the rotation of the carrier 412 to be limited by the rotation of the pump drum 428 when the carrier 412 rotates in a direction the same as the rotation of the input gear 416 and the clutch 432 is not engaged. The one-way clutch 434 allows the pump drum 428 to overrun the carrier 412.

The embodiment of the torque enhancer shown in FIG. 12 operates in the following manner. The torque enhancer 410 has a coast or gear shift mode of operation to facilitate the shifting of transmission gear ratios. In this state, the brake band 426 engages the carrier 412 to hold it in a fixed position relative to the torque enhancer housing (not shown). Clutch 432 is engaged, causing the pump drum 428 to rotate with the input gear 416. The gear pump valve (not shown) is fully open to minimize resistance to input gear 416 rotation. The output clutch 422 is released, allowing the engine to decrease in speed without braking the vehicle. The gear pump valve is then partially closed. When a gear into which the transmission is shifting is a higher gear, that is, will produce a greater rotational output speed for a given rotational input speed, then the exhaust valve is further closed to reduce engine and input gear 416 speed to a level appropriate for transmission re-engagement in the higher gear.

The torque enhancer 410 of FIG. 12 also has an idle mode of operation. In this mode of operation which occurs when the vehicle is at a stop with the engine running, the brake band 426 is released and the exhaust valve is fully opened, allowing the engine to operate at idle speed without any appreciable torsional drag thereon.

In a drive mode of operation, the torque enhancer 410 of this embodiment has the brake band 426 actuated to fix the carrier 412. Clutch 422 is locked and clutch 432 is unlocked. The gear pump exhaust valve is closed.

Figure 13:
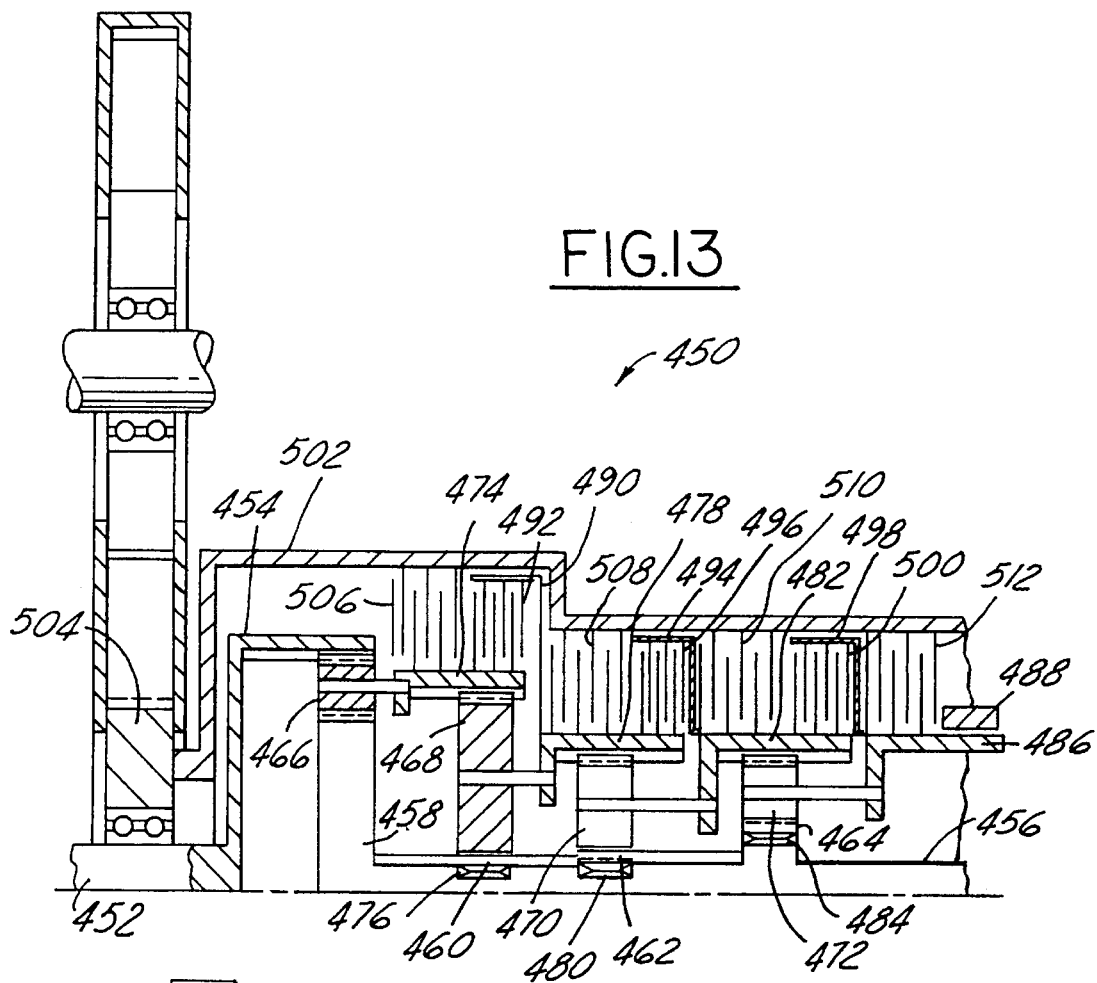
FIG. 13 is a schematic side view of a transmission made in accordance with the teachings of a tenth embodiment of this invention.
Figure 14:
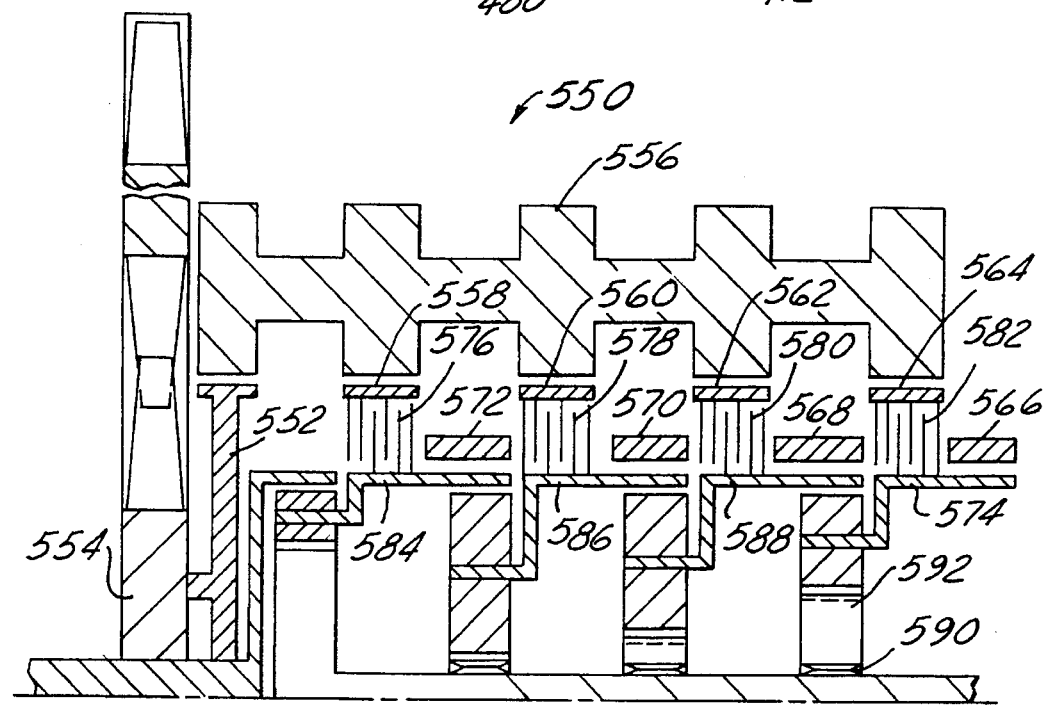
FIG. 14 is a schematic side view of a transmission made in accordance with the teachings of an eleventh embodiment of this invention.
Figure 15:
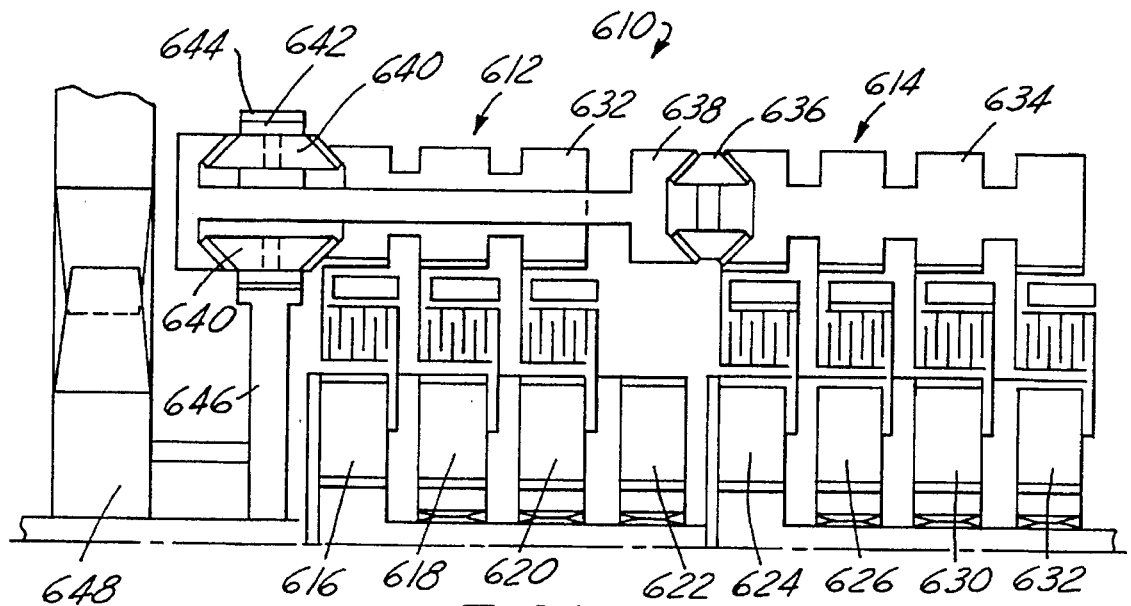
FIG. 15 is a schematic side view of a transmission made in accordance with the teachings of a twelfth embodiment of this invention.

FIGS. 13 through 15 show transmission assemblies 450, 550, and 610 which exploit the advantages of the torque enhancer.

The transmission 450 of FIG. 13 is constructed as follows. An input shaft 452 forms a first ring gear 454. An output shaft 456 provides four sun gears 458, 460, 462, 464 located axially along its length. A plurality of first planet gears 466 are disposed within the first ring gear 454. A first sun gear 458 is engaged by the planet gears 466. Shafts upon which the first planet gears 466 rotate are mounted in a second ring gear 474 which serves as a carrier for the first planet gears 466. Second planet gears 468 are disposed within the second ring gear 474. A second sun gear 460 is engaged by the second planet gears 468. A first one-way clutch 476 is disposed between the second sun gear 460 and the output gear 456. The second planet gears 468 rotate on shafts fixed to a third ring gear 478. The third ring gear 478 serves as a carrier for the second planet gears 468. Third planet gears 470 are disposed within the third ring gear 478. A third sun gear 462 is engaged by the third planet gears 470. A second one-way clutch 480 is disposed between the third sun gear 462 and the output gear 456. The third planet gears 470 are rotatably mounted on shafts fixed to a fourth ring gear 482. The fourth ring gear 482 serves as a carrier for the third planet gears 470. A plurality of fourth planet gears 472 are disposed within the fourth ring gear 482. The fourth planet gears 472 engage the fourth sun gear 464. A third one-way clutch 484 is disposed between the output gear 456 and the fourth sun gear 464. Fourth planet gears 472 are rotatably mounted to shafts fixed to an end carrier 486.

The end carrier 486 is selectively engageable by a first brake band 488. A first drum extension 490 extends from the third ring gear 478 axially toward the second ring gear 474 accommodating the placement of a second brake 492 therebetween. A second drum extension 494 extends axially forward from the fourth ring gear 482 over the third ring gear 478 accommodating third brake 496 disposed therebetween. A third drum extension 498 extends axially toward the fourth ring gear 482 and accommodates fourth brake 500 disposed therebetween. A pump drum 502 envelopes the first through fourth ring gears 454, 482 and a portion of the end carrier 486. The pump drum 502 is rotatably fixed to a pump gear 504 for unitary rotation therewith. A first pump drum clutch 506 is disposed between the pump drum 502 and the second ring gear 474. A second pump drum clutch 508 is disposed between the pump drum 502 and the third ring gear 478. A third pump drum clutch 510 is disposed between the pump drum 502 and the fourth ring gear 482. A fourth pump drum clutch 512 is disposed between the pump drum 502 and the end carrier 486.

The transmission 450 is in a first gear range for low speed operating conditions when brake band 488 engages the end carrier 486 and the second, third and fourth brakes 492, 496, 500 are disengaged. Second gear engagement is characterized by the engagement of brake band 488 with the end carrier 486 and engagement of fourth brake 500 fixing the fourth ring gear 482 to the end carrier 486. The transmission 450 is in third gear when the third brake 496 is additionally engaged. The transmission 450 is in fourth gear when the second brake 492 is engaged such that the second, third, fourth ring gears 474, 478 and 482 and the end carrier 486 are all fixed to prevent rotation.

Figure 3:
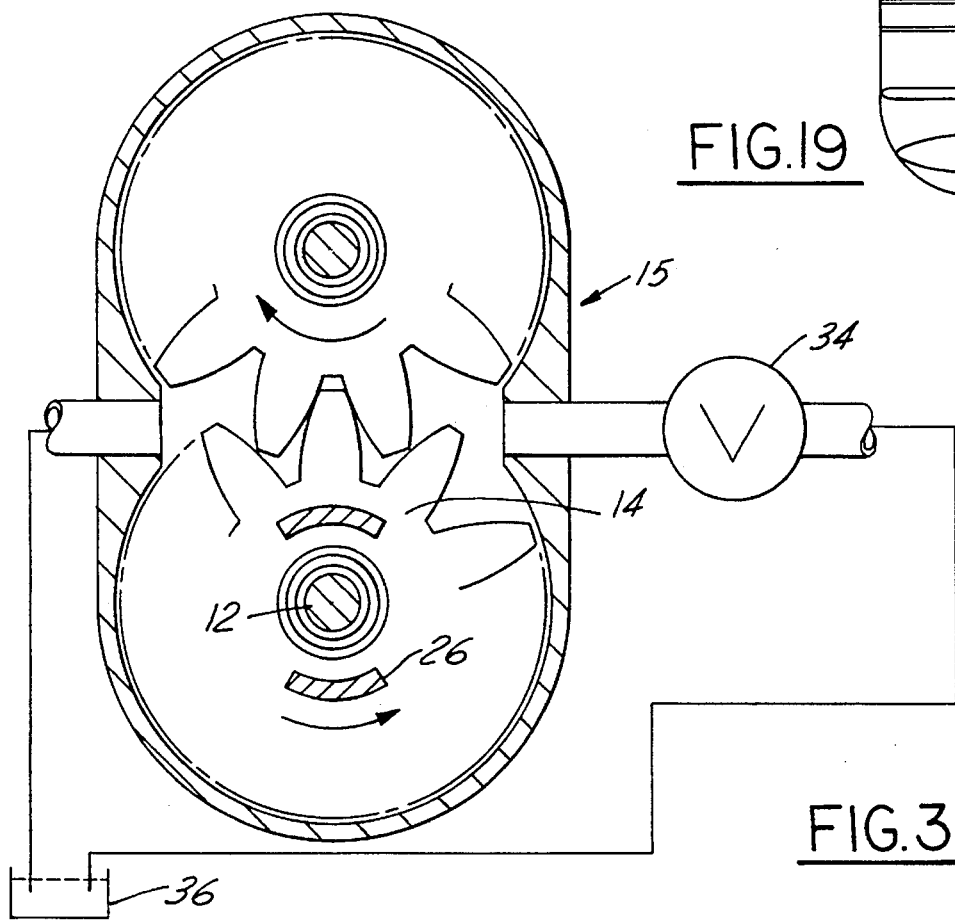
FIG. 3 is a schematic end view of a gear pump and valve assembly used by the various embodiments of this invention.

Initial vehicle acceleration is accomplished as follows. Initially, all of the clutches and brakes are released and a gear pump restriction valve like valve 34 of FIG. 3 is in a full open position. To accelerate the vehicle, the fourth clutch 512 is engaged. The gear pump restriction valve is closed off at an appropriate rate bringing the pump drum 502 to a near stop. At this point, brake band 488 is actuated, locking the end carrier 486 to the housing. As is readily apparent, the torque enhancement capability of this configuration is the same as disclosed in the most basic configuration of the torque enhancer. The rate at which the restriction valve is closed can be optimized to provide peak torque acceleration through the transmission 450.

Shifting from first gear to second gear occurs in the following manner. The fourth clutch 512 is released. The restriction valve is opened up to minimize restriction. The third clutch 510 is engaged. The restriction valve is closed at a desired rate to bring the fourth ring gear 482 to a near halt, at which point the fourth brake 500 between the fourth ring gear 482 and the end carrier 486 is engaged. The third clutch 510 is now released and the restriction valve is again opened. Shifts to third gear and to fourth gear are similarly executed using second clutch 508 with third brake 496 and first clutch 506 with second brake 492 respectively.

Theoretically, the transmission 450 could operate (i.e., change gears) without its clutches or the gear pump. To change gears brakes 492, 496 and 500 would be activated and released. This would, however, produce very abrupt gear changes. The clutches and the gear pump are used to smooth the gear changing process. If a lower gear is desired and an additional gear set is to be engaged, then the stopped ring gear which will drive that gear set is connected to the gear pump via its clutch and the gear pump restriction valve is closed. When the ring gear's brake is released its rotation is then controlled by the gear pump exhaust valve. This valve gradually opens to allow the gradual engagement of the next gear set which, when engaged, produces a lower gearing. When full engagement is achieved, the ring gear's clutch is unlocked and the ring gear rotates independently of the gear pump. The clutches and gear pump also allow each gear to operate in torque enhancement mode.

The transmission 550 shown in FIG. 14 operates in a fashion nearly identical to the operation of transmission 450. Transmission 550 of FIG. 14 is essentially the same as transmission 450 of FIG. 13 except that the pump drum 502 of transmission 450 has been replaced in transmission 550 by a connecting gear 552 rotating as a unit with the pump gear 554 and a power shaft 556 driven by four clutching ring gears 558, 560, 562 and 564. Another distinction between transmission 550 and transmission 450 is that transmission 550 employs second, third and fourth individual brake bands 568, 570 and 572 in place of the drum extensions and plate type brakes 500, 496 and 492. A first brake band 566 is still employed at an end carrier 574. First, second, third and fourth clutches 576, 578, 580, 582 are disposed between the first clutching ring gear 558 and a second ring gear 584, the second clutching ring gear 560 and a third ring gear 586, the third clutching ring gear 562 and a fourth ring gear 588, and the fourth clutching ring gear 564 and the end carrier 574. Shifting between gears in transmission 550 is accomplished in much the same fashion as in transmission 450.

To shift from first gear to second gear, clutch 582 is released while brake 566 and clutch 580 are engaged. The gear pump restriction valve is gradually closed bringing the connecting gear 552, the power shaft 556 and the third clutching ring gear 580 to a near stop at which point the second brake band 568 is engaged against the fourth ring gear 588. A third one-way or overrunning clutch 590 in a fourth sun gear 592 overruns to prevent transmission lockup. At this point, brake band 566 can optionally be released. Shifts into third and fourth gears would be similarly executed. Engagement of the clutches and brakes would follow the pattern established for FIG. 13 by the table shown in FIG. 16.

Transmission 610 shown in FIG. 15 is a "dual group" transmission with each of first and second groups 612, 614. Each group 612 and 614 has four gear sets 616, 618, 620, 622 and 624, 626, 630 and 632 respectively. The transmission 610 operates in a manner similar to the operation of transmission 550. Each gear set of the first group 612 can be uniquely paired with a gear set of the second group 614. Transmission 610 has 16 gear set combinations, which equals the number of gear sets in the first group 612 multiplied by the number of gear sets in the second group 614. Each of the four combinations of gear sets in the first group can drive any of the four combinations of gear sets in the second group. Additional gears could be created by adding additional gear sets and/or groups.

There are two power shafts 632, 634 which connect the first and second groups 612, 614 of gears to pump gear 648. These two power shafts 632, 634 rotate in opposite directions because the two groups of gears 612, 614 rotate in opposite directions. These power shafts 632, 634 can concurrently gradually stop or gradually release one gear set from each group 612, 614. A second gear pump (not shown) and connecting shaft (not shown) would allow the concurrent slowing of a gear set in one group with the gradual release of a gear set in the other group. Power shafts 632, 634 can also gradually stop or gradually release one gear set from either group 612, 614.

Overhead gear 636 reverses the rotation of shaft 634 so that shafts 632 and a connecting shaft 638 rotate in the same direction. This allows bevel gears 640 spinning within carrier 642 to act as a differential in transmitting gear pump rotation resistance to shafts 638 and 632. Thus one gear pump can smoothly control the increase or decrease in rotation speed of two gear sets, one from each group 612 and 614.

The carrier 642 has gear teeth 644 on its outside circumference which are engaged with teeth of an extension gear 646 of the pump gear 648.

It should be noted that there are potentially sixteen different gear ranges resulting from four gear ranges provided by each group 612 and 614. Each of these sixteen gear ranges can be used in the torque enhancement mode to optimize acceleration.

If desired, shafts 632 and/or 634 can be fitted with one-way clutches to prevent their rotating backward; i.e., allowing faster rotation of gears in the other group when the gear pump is not rotating or transferring rotational speed from one group to the other 612, 614.

Figure 17:
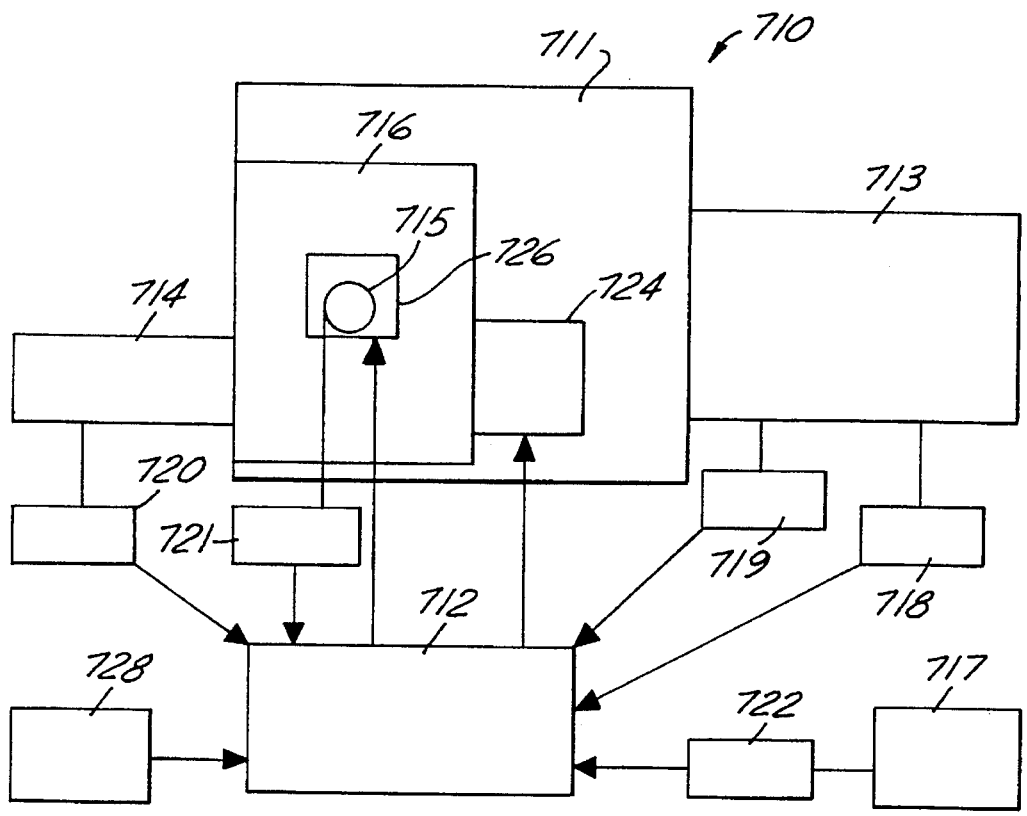
FIG. 17 is a block diagram of an electrical control system made in accordance with the teaching of a preferred embodiment of this invention and adapted for use in combination with the various embodiments of this invention shown and described with reference to FIGS. 2 and 5–9.

Referring now to FIG. 17, there is shown a block diagram illustrating the computer and/or software-based control system 710 which, in the preferred embodiment of this invention, is used in combination with a torque enhancer 711 of the type previously described with respect to FIGS. 2 and 5–9. Specifically, control system 710 includes a conventional and commercially available microprocessor 712 operating under stored program control and various sensors of vehicle speed, the gear range of a transmission 713, the speed of an engine crankshaft 714, the position of a restriction valve 715 of a gear pump 716, and a position of a vehicle throttle 717, sensors being 71S, 719, 720, 721 and 722, respectively. As shown, microprocessor 712 is electrically coupled to each of the sensors 718–722 for receiving input therefrom. Microprocessor 712 is further electrically coupled to a brake band actuator 724 which selectively applies and releases a brake band such as brake band 28 of FIG. 2 in response to signals from the microprocessor 712. The microprocessor 712 is similarly coupled to a restriction valve controller 726 for the exhaust valve 715 which is responsive to signals therefrom. Lastly, microprocessor 712 is coupled to the vehicle ignition 728. In the preferred embodiment of this invention microprocessor 712 comprises a commercially available Model 6800 manufactured and sold by the Motorola Company of Schaumburg, Illinois although various other types may be utilized.

Figure 18:
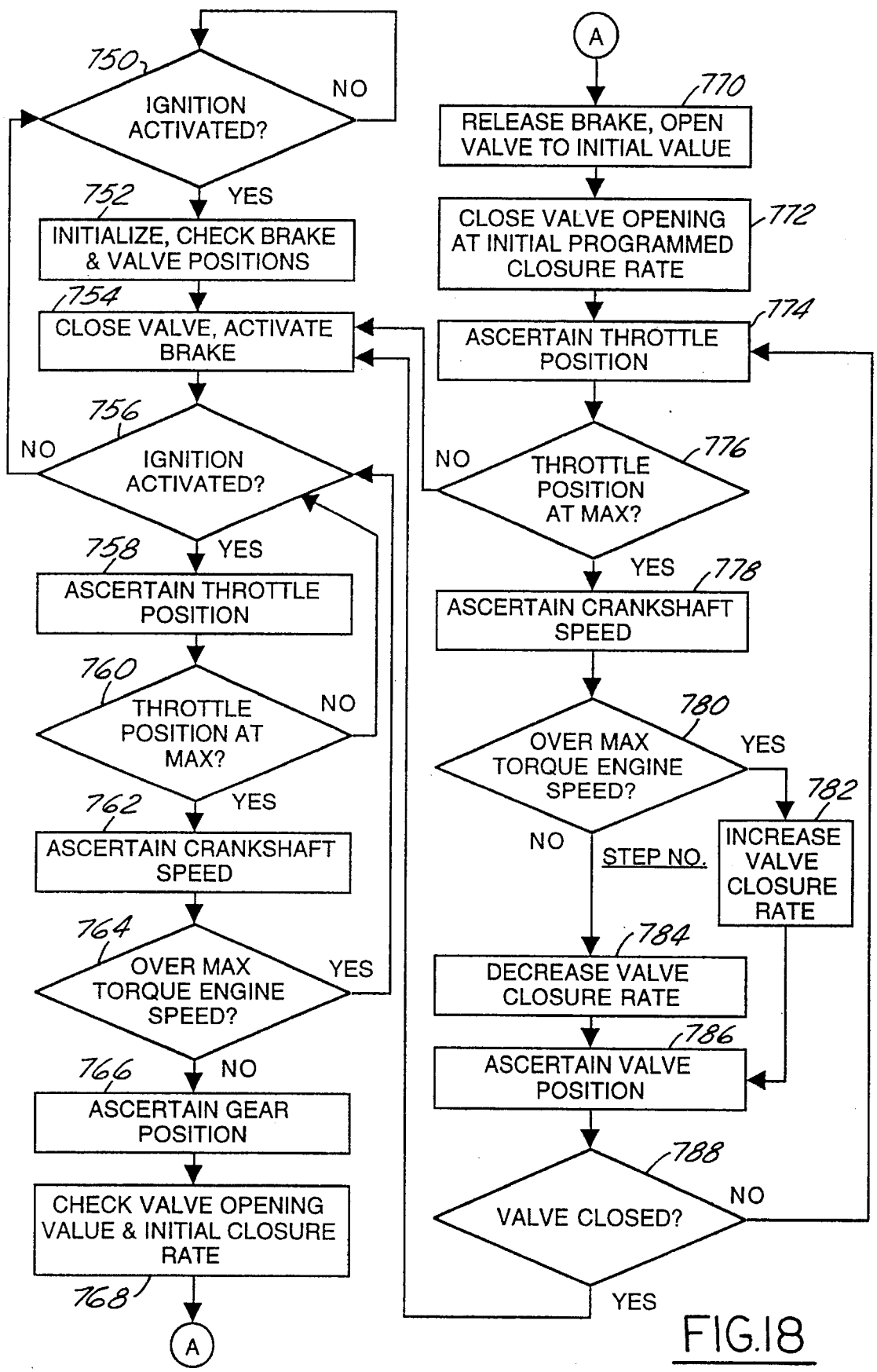
FIG. 18 is a flowchart illustrating the sequence of operational steps used by the control system shown in FIG. 17.

To understand the operation of electrical control system 710, reference is now made to a flowchart shown in FIG. 18. Specifically, microprocessor 712 initially determines whether the vehicle ignition 728 is activated in step 750. Such determination is made by monitoring ignition 728. If the ignition is activated, step 750 is followed by step 752 in which microprocessor 712 determines the current position of the brake band and the position of restriction valve 715. Moreover, in step 752 microprocessor 712 further initializes all software variables in order to ensure that the following operational steps are performed in accordance with the currently read data values and that data associated with prior readings do not corrupt current operation.

Step 752 is followed by step 754 in which microprocessor 712 signals the valve controller 726 to close the valve 715 and signals the brake actuator 724 to apply the brake band.

Step 754 is followed by step 756 in which microprocessor 712 determines whether the ignition remains activated. If the ignition remains activated, step 756 is followed by step 758 in which microprocessor 712 ascertains the position of throttle 717. Alternatively, step 756 is followed by step 750.

In step 760, microprocessor 712 determines whether the throttle is at a maximum position. If the throttle position is not at a maximum, step 760 is followed by step 756. Alternatively, step 760 is followed by step 762 in which microprocessor 712 ascertains the rotational speed of crankshaft 714. Step 762 is followed by step 764 in which microprocessor 712 determines whether the current engine or crankshaft rotational speed has exceeded the maximum torque speed. If such step 764 is followed by step 756.

Alternatively, step 764 is followed by step 766 in which microprocessor 712 ascertains the current transmission gear position by reading the output signal emanating from sensor 719. Step 766 is followed by step 768 in which microprocessor 712 checks a valve restriction table, which has been previously constructed and stored within the microprocessor, in order to obtain a valve restriction value. Microprocessor 712 also checks a valve restriction closure rate table, which has been previously constructed and stored within the microprocessor, in order to obtain an initial valve restriction closure rate. The programmed closure rate ensures a smooth maximum torque transition from a torque enhancement function to a non-torque enhancement function. Step 768 is followed by step 770 in which microprocessor releases the brake band and opens the valve to the initial orifice valve which maximizes torque output by allowing the engine to operate at maximum torque engine speed. Step 770 is followed by step 772 in which microprocessor 712 begins an initial programmed valve closure rate. Step 772 is followed by step 774 in which microprocessor 712 determines the current throttle position.

Step 774 is followed by step 776 in which microprocessor 712 determines whether the throttle position is at maximum. If the throttle position is not at maximum, step 776 is followed by step 754. Alternatively, step 776 is followed by step 778 in which microprocessor 712 determines the current crankshaft speed.

Step 778 is followed by step 780 in which microprocessor 712 determines whether the current engine speed is greater than the maximum torque speed. If the current engine speed is greater than the maximum torque speed, step 780 is followed by step 782 in which microprocessor 712 increases the valve closure rate. Alternatively, step 780 is followed by step 784 in which microprocessor 712 decreases the valve closure rate. Step 786 follows steps 782 and 784 and, in this step, microprocessor 712 ascertains the current valve position.

Step 788 follows step 786 and requires microprocessor 712 to ascertain whether valve 715 is closed. If valve 715 is not closed, step 788 is followed by step 774. Alternatively, step 788 is followed by step 754. It should therefore be apparent to one of ordinary skill in the art that microprocessor 712, operating under stored program control, is adapted to electrically control each of the embodiments shown with reference to FIGS. 2 and 5–9.

It is to be understood the invention is not limited to the exact construction or method illustrated and described above, but that various changes and modifications may be made without departing from the spirit and scope of the invention, as defined in the following claims.

I claim:

1. A combination of a driving member and a torque enhancer comprising:

the driving member having a predetermined maximum torque speed;

a housing;

a gear set rotatably supported within the housing and having an input member connected to the driving member and an output member and a reaction member wherein torque from the driving member is transferred from the input member to the output member when rotation of the reaction member is resisted;

a braking element disposed at least in part in the housing and operably engaging the reaction member to resist the rotation thereof thereby causing torque to be transferred from the input member to the output member; and controller means for automatically modulating the engagement of the breaking element when the input member is rotating at approximately the maximum torque speed of the driving member wherein the output member is accelerated while the rotational speed of the input member is maintained at approximately the maximum torque speed.

2. A combination as claimed in claim 1, wherein:

the housing defines an axis of rotation;

the input member is a first bevel gear rotatably mounted on the axis;

the output member is a second bevel gear rotatably mounted on the axis;

the reaction member includes a carrier rotatably mounted on the axis and a third bevel gear rotatably mounted to the carrier and engaging both the first and second bevel gears.

3. A combination as claimed in claim 2, further comprising:

a gear pump having a pump gear coaxial with the first bevel gear;

a fluid restriction valve disposed in a fluid output path from the pump and responsive to signals from the controller means;

an output shaft extending axially outward from the second bevel gear;

a first one way clutch disposed between the second bevel gear and the output shaft;

a selectively engagable frictional clutch functionally disposed between the output shaft and the second bevel gear;

a brake band selectively engaging the carrier;

a pump drum rotating as a unit with and extending from the pump gear past the first bevel gear to the carrier;

a selectively engagable frictional clutch disposed between the pump drum and the first bevel gear; and a second one way clutch disposed between the pump drum and the carrier.

4. A combination as claimed in claim 1, further comprising:

a selectively engageable clutch between the input member and the output member wherein engagement of the clutch rotatably fixes the input member to the output member thereby transferring torque between the input member and the output member with the braking element disengaged from the reaction member.

5. A combination as claimed in claim 1, further comprising:

a plurality of gear sets disposed in the housing in series with torque being transferred from one gear set to another and with each gear set having a selectively engagable reaction member wherein the engagement of selected reaction members provides a plurality of input torque to output torque ratios.

6. A torque enhancer as claimed in claim 1, wherein the reaction member is fixed to the housing by the braking element operatively responding to the controller means when power transferred to the output member approximately equals power transferred from the driving member to the input member.

7. A torque enhancer for disposition between a driving member and a driven member comprising:

a housing;

an input member rotatably supported by the housing and having gear teeth;

an output member rotatably supported by the housing and having gear teeth engaging gear teeth of at least one of the input member and a reaction member;

the reaction member being rotatably mounted within the housing and having gear teeth engaging the gear teeth of at least one of the output member and the input member wherein the input member has its gear teeth engaged by at least one of the reaction member and the output member and the reaction member thereby enables a transfer of torque from the input member to the output member when rotation of the reaction member relative to the housing is resisted;

brake means for selectively resisting rotation of the reaction member relative to the housing; and controller means connected to the brake means for modulating the brake means to maximize output member acceleration.

8. A torque enhancer as claimed in claim 7, wherein the reaction member comprises:

an intermediate gear functionally disposed between the output member and the input member; and a carrier rotatably supported by the housing and having the intermediate gear rotatably mounted thereto.

9. A torque enhancer as claimed in claim 8, wherein the gears are bevel gears.

10. A torque enhancer as claimed in claim 7, wherein the brake means is provided by a frictional brake band engaging the reaction member.

11. A torque enhancer as claimed in claim 7, wherein the brake means comprises:

a fluid pump having a pump member rotating as a unit with the reaction member; and a restricting valve variably restricting flow from the fluid pump.

12. A torque enhancer as claimed in claim 7, wherein the reaction member is fixed to the housing by the brake means operatively responding to the controller means when power transferred to the output member approximately equals power transferred from the driving member to the input member.

13. A method for maximizing torque transmitted to a driven element being accelerated by a driving element having a specific maximum torque speed, comprising the steps of:

providing a housing;

providing a differential gearing mechanism disposed in the housing having an input gear, an output gear and a reaction member meshing with at least one of the input gear and the output gear;

disposing the differential gearing mechanism and housing between the driving element and the driven element with the input gear rotating as a unit with the driving element and the output gear rotating as a unit with the driven element;

providing engagement means for selectively applying a selectively variable drag torque against the reaction member wherein a torque is transmitted to the output gear proportional to the drag torque against the reaction member;

setting a rotational speed of the driving element at the maximum torque speed;

gradually engaging the reaction member with the engagement means while maintaining the driving element at the maximum torque speed thereby transmitting torque to the output gear and accelerating the driven element; and fixing the reaction member relative to the housing when power produced by the driving element is approximately equal to power being transmitted to the driven element.

\* \* \* \* \*

UNITED STATES PATENT AND TRADEMARK OFFICE
CERTIFICATE OF CORRECTION

PATENT NO.  : 5,564,992
DATED       : October 15, 1996
INVENTOR(S) : Cunningham

It is certified that error appears in the above-indentified patent and that said Letters Patent is hereby corrected as shown below:

Column 13, line 5, please delete "torque enhancer" and insert --combination--

Signed and Sealed this

Thirty-first Day of December, 1996

Attest:

BRUCE LEHMAN

Attesting Officer

Commissioner of Patents and Trademarks